CASE A – LEVEL, ACCELERATION = 0
CORRECT PROBE MEASUREMENT.

CASE B – PITCH ANGLE = θ
ACCELERATION = 0
PROBE MEASUREMENT INCORRECT.

CASE C – LEVEL, – ACCELERATION = 0
PROBE MEASUREMENT INCORRECT.

CASE D – PITCH ANGLE = θ
NEGATIVE ACCELERATION
CORRECT PROBE MEASUREMENT.

INVENTORS
VICTOR H. SELIGER
HOWARD E. LUSTIG, &
BERNHARD J. HEYM
BY
ATTORNEYS

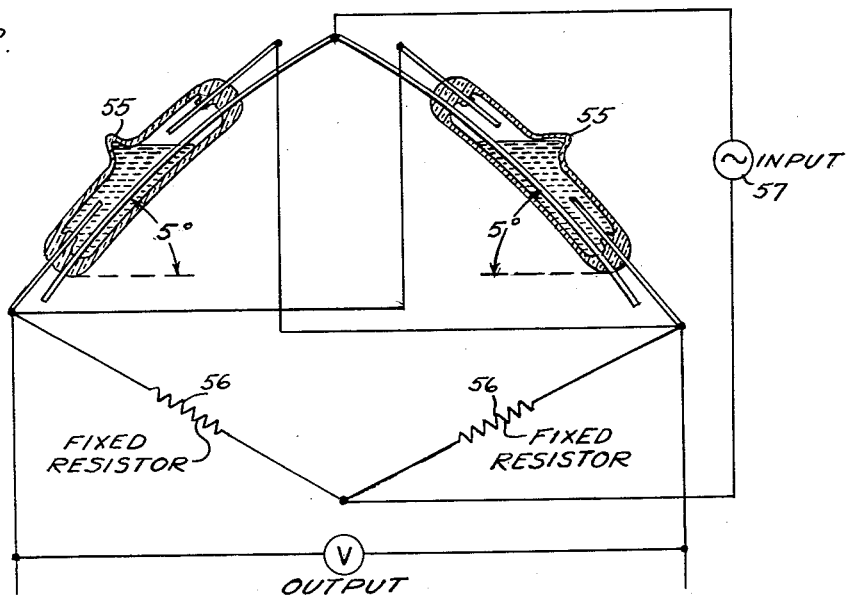
Fig. 3.
Fig. 4. ELECTROLYTIC POTENTIOMETER SWITCH LEVEL POSITION
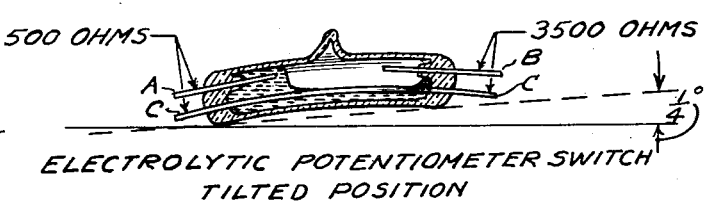
Fig. 5. ELECTROLYTIC POTENTIOMETER SWITCH TILTED POSITION
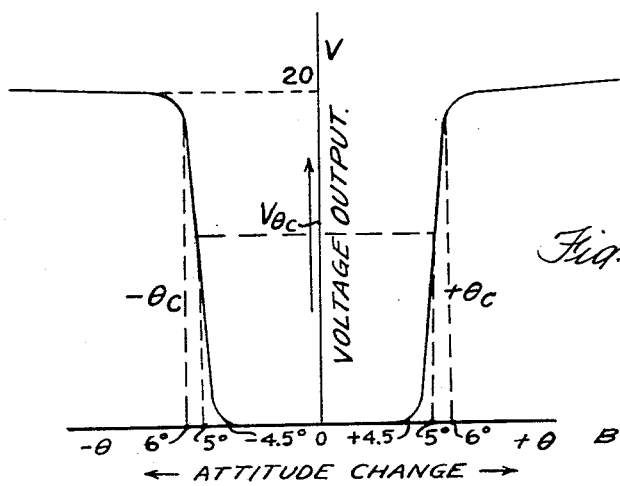
Fig. 6.
INVENTORS
VICTOR H. SELIGER,
HOWARD E. LUSTIG, &
BERNHARD J. HEYM
BY Borst and Borst
ATTORNEYS

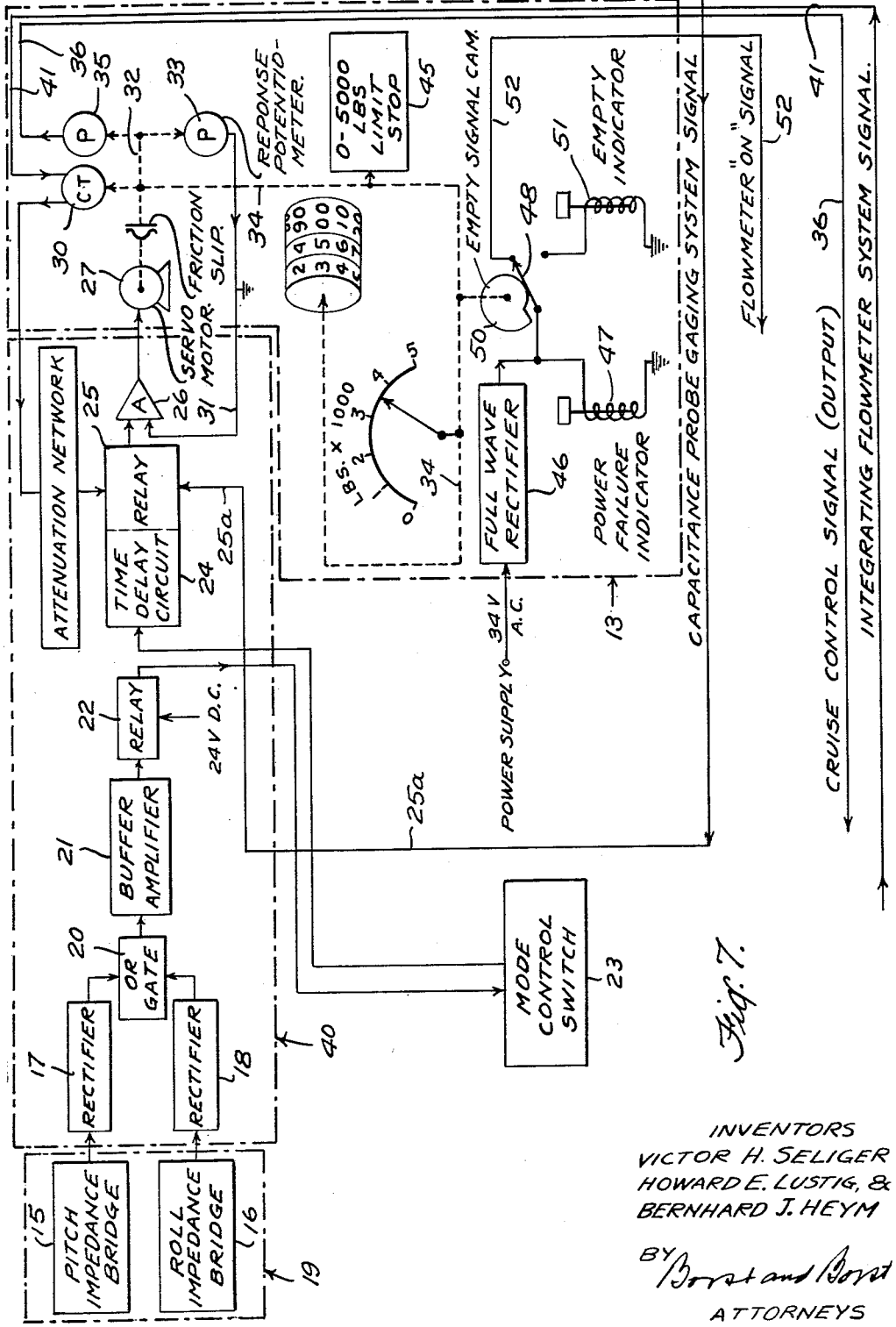

3,120,124
Patented Feb. 4, 1964

3,120,124
ALL ATTITUDE AIRCRAFT FUEL MEASURING SYSTEM
Victor H. Seliger, Lynbrook, Howard E. Lustig, Flushing, and Bernhard J. Heym, Huntington, N.Y., assignors to Sperry Rand Corporation, Ford Instrument Company Division, Wilmington, Del., a corporation of Delaware
Filed Oct. 10, 1960, Ser. No. 61,456
4 Claims. (Cl. 73—291)

This invention relates to fuel quantity indication systems and more particularly to continuous fuel quantity indicating systems carried by airborne vehicles.

Heretofore, fuel quantity indication has been obtained by employing either liquid level indicators or mass flowmeters. Accurate indication by a liquid level indicating system requires that the tank be substantially level and that the fuel in the tank be in an undisturbed condition. Where the system is airborne, fuel indication of this type is not, therefore, continuously accurate. Mass flowmeter systems measure the fuel as it enters the engines and by subtracting this indicated quantity from the original quantity yield an indication of the fuel remaining in the tank. The accuracy of the latter system is not of a high order although it is quite uniform in performance for all flight conditions. A serious disadvantage of the flowmeter system is that it does not account for losses of fuel due to leaks or damages in the fuel system.

This invention provides a fuel quantity indication system for use by airborne vehicles which is continuously accurate under all flight conditions and maneuvers of the vehicle such as climb, dive, roll, acceleration or deceleration. These fuel indications are continuously available for cruise control and fuel management decisions and for determining points of no return. More specifically the system provides an inertial sensing circuit in association with a capacitance probe gaging system and a mass flowmeter system, employment of the latter system being restricted to specified flight conditions so that the former system, which is more accurate, will have operative preference.

One object of the invention is, therefore, to provide a liquid measuring system adapted for employment on airborne vehicles and designed for continuously efficient operation.

Other objects of the invention may be appreciated on reading the following detailed description of one embodiment thereof which is taken in conjunction with the accompanying drawings, in which FIG. 1 is a block diagram of the fuel quantity indicating system;

FIG. 3 is a schematic illustrating one of the impedance bridges in the sensor;

FIG. 4 shows an electrolytic potentiometer in level position;

FIG. 5 shows an electrolytic potentiometer in tilted position;

FIG. 6 is a diagram demonstrating the relation of bridge voltage output to bridge change; and FIG. 7 is a detailed block schematic of the sensing, switching and indication section of the fuel quantity indicating system.

Figure 1:
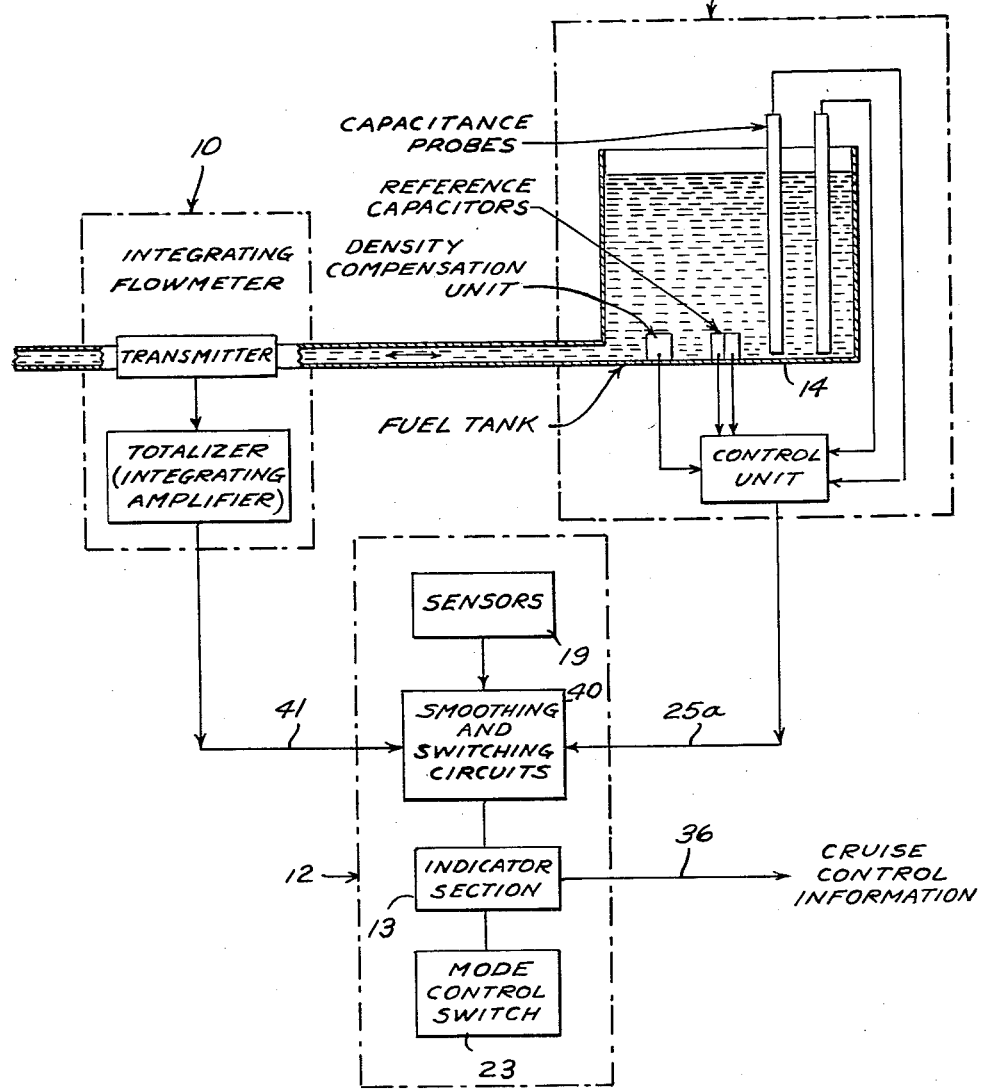

Referring to FIG. 1, the present system comprises, broadly, two standard fuel quantity measuring systems, an integrating flowmeter system 10 and a capacitance probe gaging system 11 both connected to a sensing-switching-indicating system 12. The transmitter unit of the integrating flowmeter system 10 is mounted in the fuel line for the tank 14 and supplies a voltage proportional to mass flow of fuel to an integrating mechanism. The integrating mechanism has a three wire synchro output whose total angle is proportional to change in fuel quantity. The capacitance probe gaging system contains two capacitance probes whose capacitance varies as a function of fuel level. A density compensation unit and reference capacitors yield density and dielectric constant compensation information, respectively, to a control unit which is also connected to the capacitive probes and serves to compute fuel quantity remaining. The smoothing and switching circuits 40 of the sensing-switching-indicating system 12, operate to switch into the indicator 13 fuel quantity information from the measuring system 10 or the measuring system 11 depending on aircraft attitude and acceleration conditions. Generally, the selection is effected according to the condition of the liquid in the fuel tank 14 relative to the probe axis. The measuring system 11 is arranged to use this information if the forces on the liquid are such that the surface of the liquid is substantially normal to the probe axis. However, flight conditions may be such that the fuel surface may not be substantially normal to this axis in which event the integrating flowmeter system 10 is employed. The dynamic response of fuel in the aircraft to the attendant forces and accelerations resulting from changing velocities or nonlevel flight attitudes may be simply demonstrated by the examples presented in FIGURES 2a-d. The side view of a simple rectangular tank is shown in all the diagrams and the direction of P is the longitudinal axis of the aircraft. Only aircraft attitude deviations in pitch will be considered in this discussion.

Figure 2A:
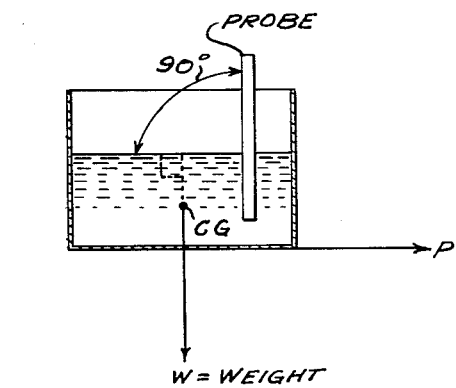
FIG. 2a, FIG. 2b, FIG. 2c and FIG. 2d are diagrams explanatory of the influence of attitude and acceleration on fuel measurement.

In Case A, as indicated in FIG. 2a, there is no specific acceleration other than that due to gravity present, and the aircraft is proceeding with constant velocity at a pitch angle of zero. Under these conditions, the surface of the fuel remains normal to the probe axis and is, therefore, correctly measurable by the capacitance probe system.

Figure 2B:
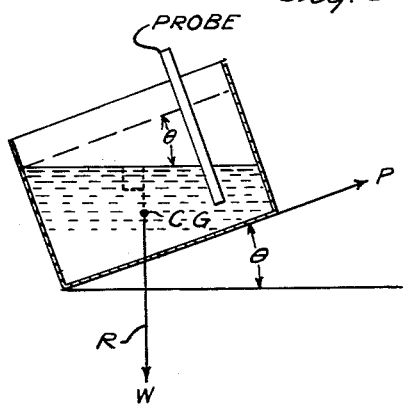

In Case B, as indicated in FIG. 2b. the aircraft is moving at pitch angle $\theta$ with constant velocity, therefore, zero acceleration. In this case the surface of the fuel will remain perpendicular to the resultant force W due to gravity. The probe reading is now incorrect; the fuel surface is not normal to the probe and is beyond the range of acceptable accuracy of measurement.

Figure 2C:
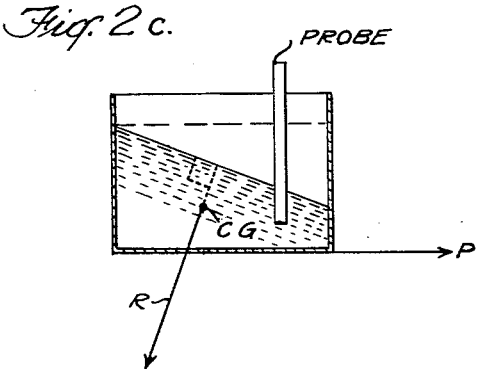

In Case C, as indicated in FIG. 2c, the aircraft is moving forward horizontally (pitch angle zero) with a horizontal acceleration not zero. In this condition the fuel surface is displaced and is normal to the resultant force (R). The probe reading is now incorrect; the fuel surface is not normal to the probe and is beyond the range of acceptable accuracy of measurement.

Figure 2D:
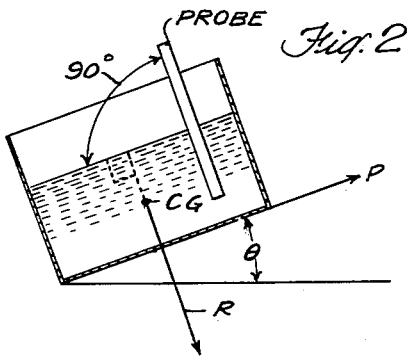

In Case D, as indicated in FIG. 2d, the aircraft is moving forward with pitch angle $\theta$ but is decelerating just sufficiently to negate the effect of the non-zero pitch angle. In this condition, the fuel surface is normal to the probe axis and is thus correctly measurable.

The inertial sensing circuit described herein responds to the specific gravity vector acting upon the aircraft fuel tanks and can be made to generate an on-off type signal as a function of the tilt of fuel in the tanks. The particular sensing circuit, as shown in FIG. 3, comprises a pair of electrolytic potentiometers 55 for measuring the effective pitch and another pair for measuring the effective roll of the aircraft with respect to the specific accelerative vector. With zero effective pitch angle, the elements of the bridge are balanced, and hence the output voltage of the bridge is zero. This condition remains essentially unchanged, up to close to the critical pitch angle. In the present system, the range of angle providing essentially zero output is from zero to ±4.5°; for angles greater than ±4.5°, the bridge output voltage rises sharply to reach a value of 20 volts root-mean-square at angles of ±6.0°. See FIG. 6.

The electrolytic potentiometer indicated above is a component whose resistance changes with tilt angle; a pair of these potentiometers are arranged in a bridge circuit containing the fixed resistors 56 and input source 57. The individual component and the effect of tilt can be seen in FIG. 4 and FIG. 5, respectively. The output voltage of the bridge circuit of FIG. 3 as a function of effective tilt is shown plotted in FIG. 6. By changing the angle of initial mechanical placement between the pair of switches, the notch can be made either wider or more narrow.

Liquid Level Mode of Operation

One bridge circuit is necessary in the sensor 19 for sensing about each of the effective roll and pitch axes. An output voltage is obtained from the particular bridge circuit involved when either $\theta_R$, (roll angle), or $\theta_P$, (pitch angle), exceeds a predetermined $\theta_C$, (critical angle). Accordingly, a pitch impedance bridge 15 and a roll impedance bridge 16 are connected to rectifiers 17 and 18, respectively, of the smoothing and switching circuits unit 40. (See FIG. 7.) An "OR" gate 20 is employed to pass the larger rectified signal to buffer amplifier 21 which increases the power level of the signal sufficiently to energize relay 22. In the particular embodiment disclosed, the range of tilt angle which provides essentially zero output is from 0° to ±4.5°; for angles greater than ±4.5° the output voltage rises sharply and reaches the value of 20 volts at angles of ±6°. Refer to FIG. 6.

The relay 22, normally connected to a 24 volt D.C. supply, is connected through a mode control switch 23 to a time delay circuit 24 which is in control of a relay 25. The relay 25 selectively connects the capacitance gaging system on conductor 25a to amplifier 26. In this mode of operation, when the fuel surface is displaced less than 4.5° from a position normal to the capacitive probes as measured along either of the two mutually perpendicular axes, pitch or roll, the relay 22 remains in the normal or closed position. Under these conditions there will be only a very small A.C. voltage output from each sensor bridge circuit; the larger of these voltages, when rectified and amplified in the buffer amplifier 21 will be insufficient to open the relay 22. As a result, the 24 volt supply is connected through the switch 23 and time delay circuit 24 to the relay 25. The relay 25, thus energized, applies the signal from the capacitance gaging system to the ground referenced amplifier 26 which is connected to servo motor 27 which is employed to drive through a friction slip coupling shaft 32 and potentiometer 33. The latter is also grounded by means of conductor 31. The signal from the capacitance gaging system is actually resistive and therefore may be compared to the resistive signal supplied by the servo system which includes the potentiometer 33. The servo motor 27 positions, through a suitable gear train including shaft 34, the counter-pointer combination, thereby, indicating the fuel quantity derived from the capacitive gaging system. Potentiometer 35 is also driven by the shaft 32 and places an analog voltage on line 36 representing fuel quantity remaining which is available as a cruise control signal.

Flowmeter Mode of Operation

This mode of operation exists when either (a) the fuel surface is displaced by more than 4.5° as measured along the effective pitch or roll axes from a position normal to the capacitive probes or (b) the switch 23 is manually placed in the flowmeter position. Where the roll or pitch sensor output is sufficiently large, after rectification and amplification, to energize the relay 22, the 24 volt excitation is removed from the relay 25. This breaks the connection between the amplifier and the capacitance probe gaging system and substitutes an attenuated signal from the rotor of the indicator synchro control transformer 30. The rotor of the synchro-control transformer is mechanically positioned by the servo motor 27 and connected shafts 32 and 34, the former shaft positioning the arm of potentiometer 33 the resistive output of which being, however, prevented from passing to the amplifier 26 by the ground connection in output lead 31. The stator of the synchro control transformer is energized by conductor 41 from a synchro transmitter in the flowmeter system that rotates at a speed proportional to fuel flow rate. The function of the attenuation circuit placed in advance of the relay 25 is to reduce the inductive signal supplied by the transformer 30 to the same scale as that which is supplied by the servo system which includes the motor 27 and the potentiometer 33.

When the switch 23 is manually placed in the flowmeter or open position, it circumvents the controlling effect of the sensor circuitry and relay 22 and removes the 24 volt excitation from the relay 25. This forces the system to remain in the flowmeter mode under all conditions. The two fuel measuring systems are normally continuously operative. However, the capacitance probe system which is in use during normal flight may break down necessitating the use of a flowmeter and integrating system during the entire flight. When such break down occurs the switch 23 is manually placed in flowmeter or open position.

Return to Liquid Level Mode of Operation

The system remains in the flowmeter mode of operation for a nominal period of 4.5 seconds after the initial application of the excitation voltage on to the relay 25 as a result of the operation of the time delay circuitry 24. The delay period is adjustable and it provides that period of time necessary to permit fuel sloshing to subside before resuming capacitive probe measurements.

The counter and pointer indicators in the indicator section 13 register from zero to five thousand pounds and limit stop 45 mounted on the shaft 34 serves to prevent over-travel of the components driven by the shaft. There is also disposed in the indicator section 13 a full wave rectifier 46 which is connected to the main power supply for the system. A flag relay 47 connected to the output of the rectifier indicates power on or off. A switch 48 is also connected to the rectifier and is actuated by empty signal cam 50 which in turn is driven by the indicator shaft 34. Flag relay 51 is employed as an empty indicator and is energized by the cam actuated switch when the fuel indication is less than 200 pounds. A drive motor (not shown) in the integrating flowmeter system 10 is connected to the main power supply through the switch 48 and conductor 52 and becomes deenergized at this point to prevent its operation whenever there is an insufficient quantity of fuel remaining.

Various modifications of the invention may be effected by persons skilled in the art without departing from the scope and principles thereof as defined in the appended claims.

What is claimed is:

1. A fuel measuring and indicating system comprising two measuring systems and an indicating system, one of said measuring systems being an integrating type mass flowmeter and the second measuring system being a true weight capacitance probe gaging system which includes a fuel tank and means for measuring the capacitance of the fuel in said tank and said indicating system having liquid inertial sensors adapted to generate a voltage when the sensors are subjected to inertial forces in excess of a preselected value, a relay circuit responsive to the output of said liquid inertial sensors, an indicator, said relay circuit being connected to each of said fuel measuring systems and adapted to introduce selectively the output of one of said systems to said indicator in accordance with the state of said liquid inertial sensors, said relay system being arranged to introduce the output of said capacitance probe gaging system into said indicator when the inertial forces on the sensors are below the preselected value and selectively to introduce the output of the mass flowmeter into the indicator when the inertial forces on the sensors are above the preselected value.

2. A fuel measuring and indicating system comprising two measuring systems and an indicating system, one of said measuring systems being an integrating type mass flowmeter and the second measuring system being a true weight capacitance probe gaging system which includes a fuel tank and means for measuring the capacitance of the fuel in said tank and said indicating system having liquid inertial sensors adapted to generate a voltage when the sensors are subjected to inertial forces in excess of a preselected value, each of said sensors including an impedance bridge having an electrolytic potentiometer in at least one leg thereof, a relay circuit responsive to the output of said liquid inertial sensors, an indicator, said relay circuit being connected to each of said fuel measuring systems and adapted to introduce selectively the output of one of said systems to said indicator in accordance with the state of said liquid inertial sensors, said relay system being arranged to introduce the output of said capacitance probe gaging system into said indicator when the inertial forces on the sensors are below the preselected value and selectively to introduce the output of the mass flowmeter into the indicator when the inertial forces on the sensors are above the preselected value.

3. A fuel measuring and indicating system comprising two measuring systems and an indicating system, one of said measuring systems being an integrating type mass flowmeter and the second measuring system being a true weight capacitance probe gaging system which includes a fuel tank and means for measuring the capacitance of the fuel in said tank and said indicating system having liquid inertial sensors adapted to generate a voltage when the sensors are subjected to inertial forces in excess of a preselected value, each of said sensors including an impedance bridge having an electrolytic potentiometer in at least one leg thereof, a relay circuit responsive to the output of said liquid inertial sensors, an indicator, said relay circuit being connected to each of said fuel measuring systems and adapted to introduce selectively the output of one of said systems to said indicator in accordance with the state of said liquid inertial sensors, said relay system being arranged to introduce the output of said capacitance probe gaging system into said indicator when the inertial forces on the sensors are below the preselected value and selectively to introduce the output of the mass flowmeter into the indicator when the inertial forces on the sensors are above the preselected value, and a time delay circuit disposed in the relay circuit connection between said capacitance probe gaging system and said indicator.

4. A system as described in claim 3 wherein said relay circuit is adapted normally to connect said capacitance probe gaging system to said indicator and to connect the integrating mass flowmeter system to the indicator solely under preselected conditions of system acceleration and attitude.

References Cited in the file of this patent
UNITED STATES PATENTS

| | | |
|---|---|---|
| 2,387,313 | Wilson | Oct. 23, 1945 |
| 2,500,348 | De Giers et al. | Mar. 14, 1950 |
| 2,656,977 | Cummings | Oct. 27, 1953 |
| 2,713,727 | Balsam | July 26, 1955 |
| 2,860,511 | Wickesser | Nov. 18, 1958 |